3,309,175
PRODUCTION OF A HIGH-POROSITY REFRACTORY

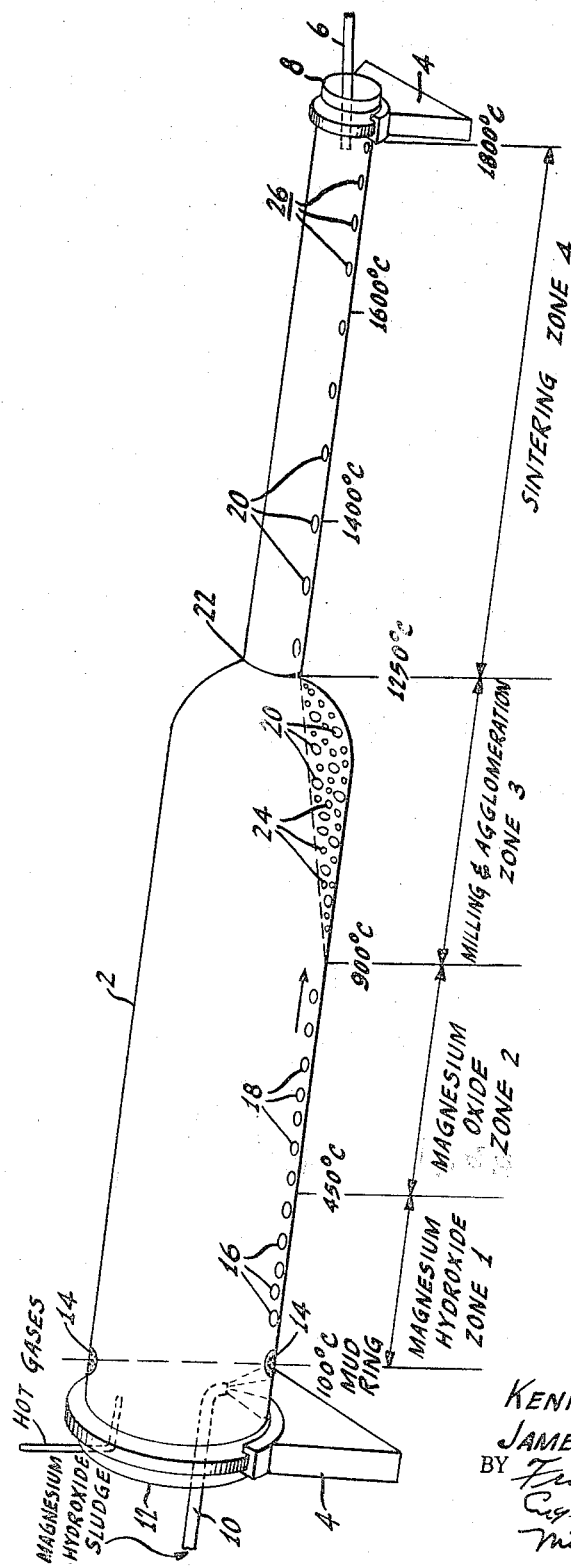

Kenneth M. Berg, Coral Gables, Fla., and James A. Robertson, Levittown, Pa., assignors to FMC Corporation, New York, N.Y., a corporation of Delaware
Filed Oct. 17, 1963, Ser. No. 320,250
5 Claims. (Cl. 23—201)

The present invention is concerned with the production of high-porosity refractories, and especially those refractories containing a major proportion of magnesium oxide.

In the construction of high-temperature furnaces employed in the production of iron and steel, it is customary to employ a lining of high-temperature refractory bricks. One frequently used refractory material is synthetic periclase, made by sintering either magnesia or sea water-derived magnesium hydroxide sludges at temperatures of from about 1600–1800° C. Such magnesium hydroxide sludges are obtained from sea water by the process described in U.S. Patent No. 2,703,273, granted to James A. Robertson et al. on Mar. 1, 1955.

The magnesium oxide refractories which have been generally employed are those having low porosities, i.e. below about 10%. Low-porosity magnesium oxide refractories have been desired in order to prevent the furnace slag from attacking the refractory and causing spalling of the refractory which enhances consequential erosion and breakdown of the brick. The spalling is brought about by slag penetrating the pores of the refractory brick and breaking off layers of the brick at the slag interface. Such spalling is highly undesirable, since it causes rapid erosion of the brick and greatly diminishes its life in the furnace.

Recently a new type of refractory brick has been developed as described in U.S. application No. 317,044, filed Oct. 17, 1963, filed in the names of William A. Tidridge, David Goldstein and Jared S. Sproul now U.S. Patent 3,265,513 whose refractory properties are due to the combination of two refractory components working in combination. These refractory bricks are composed of porous periclase (MgO) particles thoroughly penetrated by interlacing ribbons of carbon so that alternate interfaces of carbon and magnesia are employed as the working refractory surfaces. In order to obtain good carbon penetration of the periclase particles and to combine these particles into a hard brick, a strong but porous periclase structure is necessary.

Heretofore, it has not been found possible to prepare highly porous periclase from brine-derived magnesia in a conventional kiln process. This is due to the difficulty in building up a porous structure from brine-derived magnesium hydroxide. As a result, brine-derived periclase that is available is in the form of small high-density particles having very low "open porosity" and pores whose "effective" diameter is too small to permit ready penetration by substantial quantities of tar or pitch. The "effective" diameter of any pore is its smallest diameter through which mercury penetrates in substantially filling the pore.

The percent "open porosity" is defined as the volume percent of the sample that is penetrable by mercury when pressure is applied over the range of 1.8 to 5,000 p.s.i. absolute. The percent open porosity can be readily determined using an Aminco-Winslow Porosimeter, manufactured by the American Instrument Co., Inc. of Silver Spring, Md., which is designed to permit pressures of up to 5,000 p.s.i. absolute to be exerted on mercury used to penetrate pores. In using this technique, the porous sample is first impregnated with mercury under a pressure of 1.8 p.s.i. absolute. At this pressure the mercury penetrates all voids and surface cracks which are larger than 100 microns. The pressure on the mercury is then increased, up to 5000 p.s.i. absolute during which increased amounts of mercury penetrate the porous sample. The increase in the volume of mercury which penetrates the sample from 1.8 to 5000 p.s.i. absolute indicates its open porosity.

It is an object of the present invention to produce a porous periclase having an open porosity of from about 25–50% from brine-derived magnesium hydroxide.

It is a further object to produce porous periclase for use in making carbon-penetrated refractory particles suitable for incorporation in refractory bricks.

The drawing shows the rotary kiln utilized to prepare our magnesium oxide particles.

We have now found that a refractory, porous, magnesia particle can be produced by agglomerating magnesium oxide particles (derived from brines) having a silica content not above about 4% and having a crystallite size of from about 1 to about 40 microns into a porous structure, sintering these particles at a temperature of from about 1600–1800° C. and recovering a strong magnesium oxides particle having an open porosity of from about 25–50%, and preferably 30–50%, and in which substantially all pores have an effective diameter above about 5 microns.

In the present process, seat water or bitterns containing economically recoverable quantities of magnesium ions can be used. The bitterns are the supernatant mother liquors which remain after seat water has been evaporated in the process of recovering ordinary salt. Bitterns are preferred because of the high concentration of magnesium present in the solution. While seat water and bitterns are the brines having the most likely source of magnesium ion, it should be appreciated that any solution of soluble magnesium salts containing recoverable quantities of magnesium ion can be utilized for this purpose, including brines derived from underground deposits of soluble magnesium salts.

The magnesium ion which is present in the solution of bitterns is separated as insoluble magnesium hydroxide by adding a lime to the solution. This procedure is fully described in U.S. Patent No. 2,124,002, issued to Mastin on July 19, 1938. Precipitating agents such as lime or calcined dolomitic materials (dolime) may be employed in the present process to produce insoluble magnesium hydroxide.

In the preferred embodiment of the invention, the magnesium hydroxide sludge thus precipitated is employed as the feed to a rotary kiln. The sludge is heated in the kiln to temperatures of 100° C., during which free water is removed and the magnesium hydroxide forms mud balls. As these mud balls roll down the kiln, they are heated to progressively higher temperatures. When the magnesium hydroxide mud balls reach temperatures of about 450° C. the magnesium hydroxide is converted to magnesium oxide. The magnesium oxide thus formed retains the outward mud ball configuration, but is made up ultimately of very light, flaky material having crystallites substantially smaller than one micron, i.e. 0.01 micron. These balls are extremely fragile and subject to breakage by application of any sharp blows. The magnesium oxide balls are gradually heated from about 450° C. to about 900° C. within the kiln. During this temperature increase, the magnesium oxide flake particles (which make up the balls in the kiln) shrink and aggregate into small particles whose crystallite size increases to about one micron (as measured by microscopic observation). When the crystallites of magnesium oxide which make up the balls, reach this stage, they are introduced into the milling and agglomeration zone of the kiln.

In the milling and agglomeration zone, a mass of discrete, hard, porous, previously produced magnesium oxide spheres is permitted to accumulate by holding back the flow of these spheres though the remainder of the kiln. The hold-up of these spheres is best obtained by reducing the interior diameter of the kiln. This can be achieved by an annular hold-up wall or a constriction in the kiln.

The mass of hard spheres, upon being rotated in the kiln, act as a ball mill and break up the softer magnesium oxide balls as they flow down the kiln into this grinding and agglomeration zone. Within the agglomeration zone, the temperature ranges from about 900 to about 1200° C. As the magnesium oxide balls are broken up into small particles, these particles are gradually heated to between about 900 to about 1050° C. and become sticky. In this state, they begin to form magnesium oxide spheres by agglomeration of the small particles on the surface of the spheres or alternately, by agglomeration on the surface of seed nuclei; these may be previously sintered periclase nodules which are passed into the kiln along with the magnesium oxide sludge.

Within this milling and agglomeration zone, there is on the one hand, the crushing action of the magnesium oxide spheres attempting to break up these particles into finer material while simultaneously these particles, because of their sticky condition, are trying to build up by agglomeration into hard magnesium oxide spheres. As the temperature increases from about 1050 to about 1100° C., the particles become harder and more resistant to breakdown caused by the crushing action of magnesium oxide spheres, so that the particles begin to build up into hard porous spheres in the tumbling bed. When temperatures of between about 1100 to 1200° C. are reached, these particles have built up into porous, hard, magnesium oxide spheres.

At these temperatures, the crystallites of magnesium oxide in the particles generally have a size of about 1–2 microns. As these porous magnesium oxide spheres are heated to temperatures of 1250° C. and above, the particles become harder and sinter in place within their porous structure and the crystallite size of the magnesium oxide particles begins increasing in size.

As the number of magnesium oxide spheres builds up in the milling and agglomeration zone, some of the spheres spill over the constricted portion of the kiln and pass down through the remainder of the kiln where they are sintered at progressively higher temperatures up to about 1600 to 1800° C. At this point, the crystallite size of the magnesium oxide particles making up the spheres ranges from about 2 to about 40 microns and the spheres have an open porosity of from 25–50% with substantially all the pores having an effective diameter greater than about 5 microns. The maximum effective diameter of the pores obtained by this preferred embodiment of the process is on the order of about 100 microns. Larger pore diameters can be obtained if desired by employing other agglomeration techniques as set forth hereinafter.

In the present process, it is necessary that the crystallites contained in the particles from the crushed magnesium oxide balls have a size of at least about 1 micron prior to being agglomerated and calcined. If the magnesium oxide particles have crystallites below this size and they are rapidly agglomerated and sintered, the resultant magnesium oxide sphere shrinks along with the particles upon sintering and the porosity is reduced below the desired level. Surprisingly, when the crystallite size of the magnesium oxide particles in the magnesium oxide balls prior to sintering is about 1 micron and above, no substantial shrinkage of the magnesium oxide spheres takes place during calcination, even though shrinkage of the MgO particles making up the sphere does occur. This unusual calcining action is most important in obtaining the high porosity which is produced by the present process.

In the preferred embodiment of the invention, the agglomeration of the particles from the crushed magnesium oxide balls takes place at temperatures from about 900–1050° C. It is during this temperature range that the magnesium oxide particles commence to become sticky and can agglomerate into a hard, porous magnesium oxide structure. In general, it is preferable that the magnesium oxide balls be crushed at a temperature not lower than about 900° C., put prior to the temperature at which they become sticky and begin to accrete. If milling occurred at temperatures substantially less than 900° C. within the kiln, these particles would remain in the kiln for a substantial time prior to being agglomerated and some would be blown out by the hot air stream passing through the kiln. An excessive amount of these fines would thus be blown out through the mouth of the kiln, thereby wasting a good part of the feed.

In the above process, the presence of minor amounts of impurities does not hinder the production of hard, porous magnesium oxide spheres unless the impurities form a substantial liquid phase in the sintering zone of the kiln. In this event, the liquid phase penetrates the magnesium oxide spheres and acts as a flux in shrinking the sphere during the sintering stage with the result that lower porosities are obtained. The amount of impurity which can be permitted and still obtain hard porous balls depends upon the specific impurities and the degree of porosity desired. For example, in the formation of magnesium oxide having open porosities of 25–50%, the silica content (as $SiO_2$) should not be permitted to reach above about 4% by wt.

In the preferred process, agglomeration of the magnesium oxide particles having a crystallite size of about 1 micron or above takes place in the milling and agglomeration zone of a rotary kiln. However, it is possible initially to prepare magnesium oxide particles with crystallites of at least about 1 micron by heating MgO to 900–1000° C. and then agglomerating them by means of sticky binders or other adhesive means; if this porous structure is fired at temperatures from 1600–1800° C., the adhesive material will be consumed or dispersed and the remaining particles will sinter into a strong, porous structure. The maximum pore diameter of the magnesium oxide particle can be controlled, if desired by altering the type and quantity of the adhesive material and the manner of its incorporation. However, since magnesium oxide crystallites of this size are usually formed by heating MgO to temperatures of about 900–1000° C., the preferred process is to agglomerate these particles within the kiln when they go through the tacky stage between temperatures of about 900 to 1050° C. In this way, a continuous process commencing with magnesium hydroxide sludge and ending with a refractory porous product is obtained without interrupting the kiln operation to remove intermediate kiln products, and agglomerate them outside the kiln.

The process will now be described with reference to the attached drawing. In the drawing, there is shown rotary kiln 2 supported by members 4. The kiln is heated by passing hot gas from fuel burner 6 into the discharge end 8 of kiln 2. The kiln is divided into four principal zones. Zone I is a magnesium hydroxide zone, zone II is a magnesium oxide zone, zone III is a milling and agglomeration zone and zone IV is a sintering zone. In this process, a magnesium hydroxide sludge precipitate, obtained preferably by precipitating magnesium hydroxide from bitterns by the addition of dolime, is fed by conduit means 10 into the feed end 12 of kiln 2. As the sludge flows down the kiln it contacts the hot gases and free water is removed from the sludge. When the sludge has reached about 100° C. it forms a mud ring 14 in the kiln. Thereafter, the mud takes on the form of small mud balls 16 as increasingly greater amounts of water are evaporated in the kiln. These mud balls flow downwardly through the kiln and are progressively heated through the kiln until a temperature of 450° C. is reached. Thereafter, the mud balls 16 enter zone II where they are gradually converted to magnesium oxide. The magnesium oxide balls 18 are gradually heated until they are at a temperature of about 900° C., during which the magnesium oxide crystallites which make up the mud balls have grown to a size of about one micron. These balls 18 are then passed at temperatures of about 900° C. into zone III, the milling and agglomeration zone. In zone III, there is an accumulation of hard, porous previously produced magnesium oxide spheres 20. The spheres 20 are prevented from flowing down the remainder of the kiln by means of the constriction 22 in the diameter of the kiln. As the magnesium oxide balls contact spheres 20, the spheres break up the softer magnesium oxide balls 18 into small particles. The cracking and breaking of the balls 18 continues in zone III until the particles become sticky. This occurs between temperatures of about 900 and about 1000° C. When this takes place, the sticky particles commence agglomerating on resident magnesium oxide spheres 20 or, if desired, upon seed nodules 24 which may be passed into the kiln along with the magnesium hydroxide sludge. The temperature of the magnesium oxide spheres 20 in zone III increases until temperatures of about 1250° C. are obtained, during which the spheres become sufficiently hard, and resist the crushing action within milling zone III. As the number of magnesium oxide spheres 20 accumulate in zone III, they spill over constriction 22 in the kiln 2 and pass into the sintering zone IV. In the sintering zone, the magnesium oxide spheres 20 are heated to temperatures up to about 1800° C. and thereby are converted into hard porous periclase balls 26. The sintering temperatures may range from 1600–1800° C. depending upon the final temperature desired. Hard porous periclase balls 26 are then removed from the discharge end 8 of the kiln 2 and cooled to obtain the desired product.

In the drawing, the kiln has been pictured as having two internal diameters. However, it should be realized that the same effect can be obtained by using a kiln of a constant diameter with an annular hold-up wall in place of the constriction 22 of the previously-described kiln. In addition, while the milling and agglomeration zone III has been described as having a temperature range of 900–1250° C., it is to be understood that a temperature higher than 1250° C., can be used in zone III provided that agglomeration occurs between about 900° C. and about 1050° C. in this zone.

The following example is given to illustrate the invention and is not deemed to be limitative thereof.

*Example*

A pilot kiln having the configuration shown in the attached drawing was heated by means of combustion gases being fed into the discharge end of the kiln. The sintering zone was maintained at an average temperature of between about 1800–1850° C., except at the end of the run when the temperature was reduced to about 1600° C. The milling and agglomeration zone, as defined in the drawing, was heated to temperatures ranging from 950–1300° C. A magnesium hydroxide sludge was obtained by adding dolime to sea water bitterns and had a particle size of about 50% +200 mesh and analyzed 1.2% $SiO_2$, 0.7% CaO and about 97.3% MgO. The sludge was added into the mouth of the kiln at a rate, based on magnesium oxide, of 115 moles per hour while the kiln was rotated at 1 r.p.m. The resulting calcined magnesium oxide product was sampled every 2 hours for its open porosity and silicon dioxide content. The results are shown in the following table. In addition, samples were also taken when the temperature in the sintering zone was about 1600° C. and the open porosity and silicon dioxide content of these samples are also reported in the table. The open porosity was determined by mercury penetration under superatmospheric pressures. The effective diameter of 99.3% of the pores was between 5 microns and 100 microns as determined by mercury penetration.

TABLE

| Sample No. | Calcining Temperature, ° C. | Silicon Dioxide, Percent | Open Porosity, Percent |
|---|---|---|---|
| 1 | 1,825 | 5.89 | 14.4 |
| 2 | 1,825 | 5.50 | 16.0 |
| 3 | 1,800 | 3.45 | 29.1 |
| 4 | 1,875 | 2.73 | 36.4 |
| 5 | 1,810 | 1.77 | 45.3 |
| 6 | 1,825 | 1.62 | 47.4 |
| 7 | 1,900 | 1.43 | 35.4 |
| 8 | 1,850 | 1.42 | 40.1 |
| 9 | 1,910 | 1.73 | 48.4 |
| 10 | 1,850 | 1.49 | 46.3 |
| 11 | 1,670 | 1.52 | 49.0 |
| 12 | 1,550 | 1.56 | 46.8 |

Pursuant to the requirements of the patent statutes, the principle of this invention has been explained and exemplified in a manner so that it can be readily practiced by those skilled in the art, such exemplification including what is considered to represent the best embodiment of the invention. However, it should be clearly understood that, within the scope of the appended claims, the invention may be practiced by those skilled in the art, and having the benefit of this disclosure, otherwise than as specifically described and exemplified herein.

What is claimed is:

1. Process of producing a refractory magnesium oxide particle comprising introducing brine derived magnesium hydroxide into a rotary heating zone, said rotary heating zone having a constriction therein, heating said magnesium hydroxide to a temperature of from about 450–900° C. to form magnesium oxide particles, passing said magnesium oxide particles into a milling and agglomerating zone within said kiln, said milling and agglomerating zone being formed by the hold-up of magnesium oxide particles by said constriction within said rotary heating zone, crushing said magnesium oxide particles and agglomerating the crushed magnesium oxide particles into porous balls of magnesium oxide having a silica content not above 4% and a crystallite size of from about 1–40 microns within said milling and agglomerating zone, said agglomerating of the crushed magnesium oxide particles being carried out at temperatures of from about 900–1050° C., sintering said magnesium oxide porous balls at temperatures of from about 1600–1800° C. and recovering magnesium oxide particles having an open porosity of from about 25–50%, said porosity being formed by pores substantially all of which have an effective diameter above about 5 microns.

2. Process of claim 1 in which said brine derived magnesium hydroxide is obtained from sea water bitterns.

3. Process of producing a refractory magnesium oxide particle comprising introducing brine derived magnesium hydroxide into a rotary heating zone, said rotary heating zone having a construction therein to hold up the flow of material therethrough, heating said magnesium hydroxide to a temperature of about 450° C. to form magnesium oxide particles, further heating said magnesium oxide particles to a temperature of at least about 900° C. but not above about 1000° C. to increase the size of the crystallites in said particles to at least about 1 micron, passing magnesium oxide particles having crystallites at least about 1 mircon into a milling and agglomerating zone within said kiln, said milling and agglomerating zone containing a mass of magnesium oxide particles held up by said constriction within said rotary heating zone, crushing said heated magnesium oxide particles by the milling action of said mass of magnesium oxide particles and agglomerating the resulting crushed particles into porous balls of magnesium oxide at a temperature of from about 900–1050° C. within said milling and agglomerating zone, said porous balls of magnesium oxide containing not more than 4% silica, passing said porous balls of magnesium oxide from said milling and agglomerating zone into a sintering zone, sintering said porous balls of magnesium oxide at temperatures of from about 1600–1800° C. and recovering magnesium oxide particles having a crystallite size of from about 1 to about 40 microns and an open porosity of from about 25–50%, said porosity being formed by pores substantially all of which have an effective diameter of from about 5 to about 100 microns.

4. A refractory particle consisting essentially of at least about 95% by weight magnesium oxide, and not more than about 4% SiO$_2$, made up of magnesium oxide crystallites having a size of from about 1 to about 40 microns, said particle having an open porosity of from about 30 to about 50% in which the pores of said particle have an effective diameter of from about 5 to about 100 microns.

5. The refractory particle of claim 4 which consists essentially of at least about 95% by weight magnesium oxide and from about 1.4 to about 4% SiO$_2$.

References Cited by the Examiner

UNITED STATES PATENTS

| | | | |
|---|---|---|---|
| 2,183,379 | 12/1939 | Franck et al. | 23—279 X |
| 2,348,847 | 5/1944 | Pike | 23—201 |
| 2,487,290 | 11/1949 | Austin et al. | 23—201 |
| 2,579,886 | 12/1951 | Vettel | 23—201 |
| 2,641,532 | 6/1953 | Hicks | 23—201 |
| 2,812,241 | 11/1957 | Austin et al. | 23—201 |

FOREIGN PATENTS

| | | |
|---|---|---|
| 234,548 | 10/1959 | Australia. |
| 628,253 | 9/1961 | Canada. |

OSCAR R. VERTIZ, *Primary Examiner.*

G. T. OZAKI, *Assistant Examiner.*